No. 666,917. Patented Jan. 29, 1901.
C. G. BAUER.
MACHINE FOR CHARGING WAX AND CORKS INTO VESSEL CAPS.
(Application filed Apr. 14, 1900.)
(No Model.) 5 Sheets—Sheet 1.
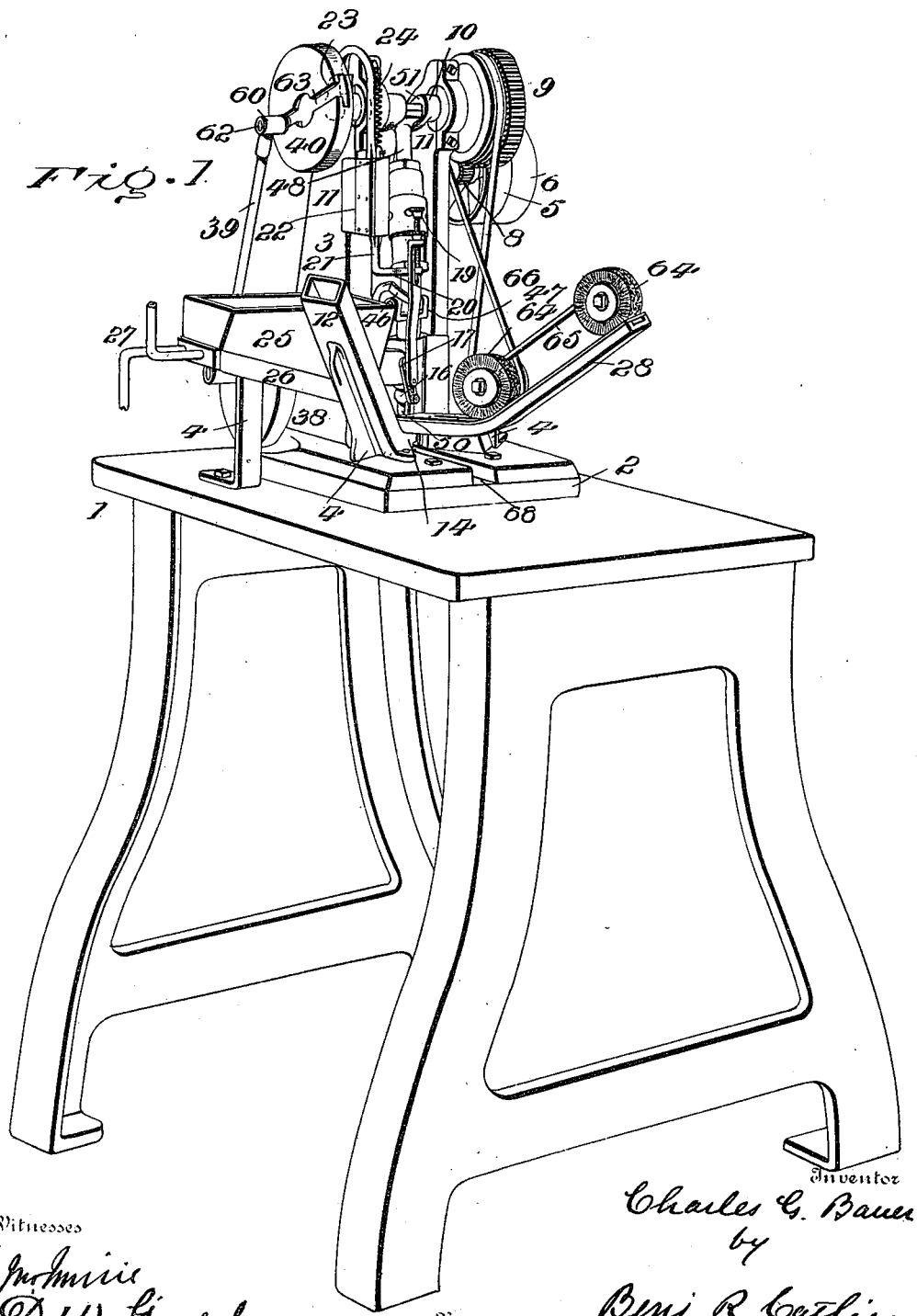

No. 666,917. Patented Jan. 29, 1901.
C. G. BAUER.
MACHINE FOR CHARGING WAX AND CORKS INTO VESSEL CAPS.
(Application filed Apr. 14, 1900.)
(No Model.) 5 Sheets—Sheet 2.
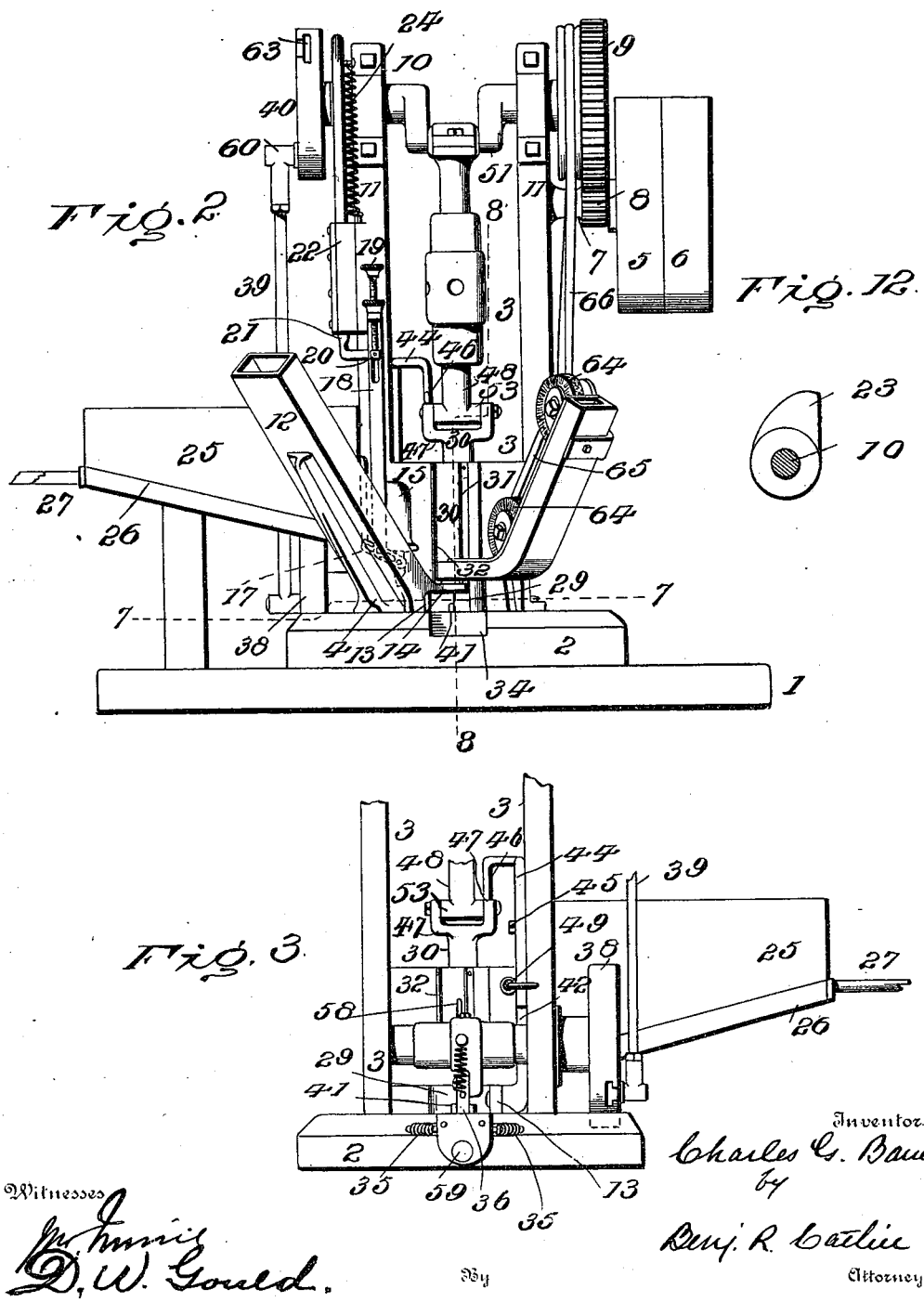

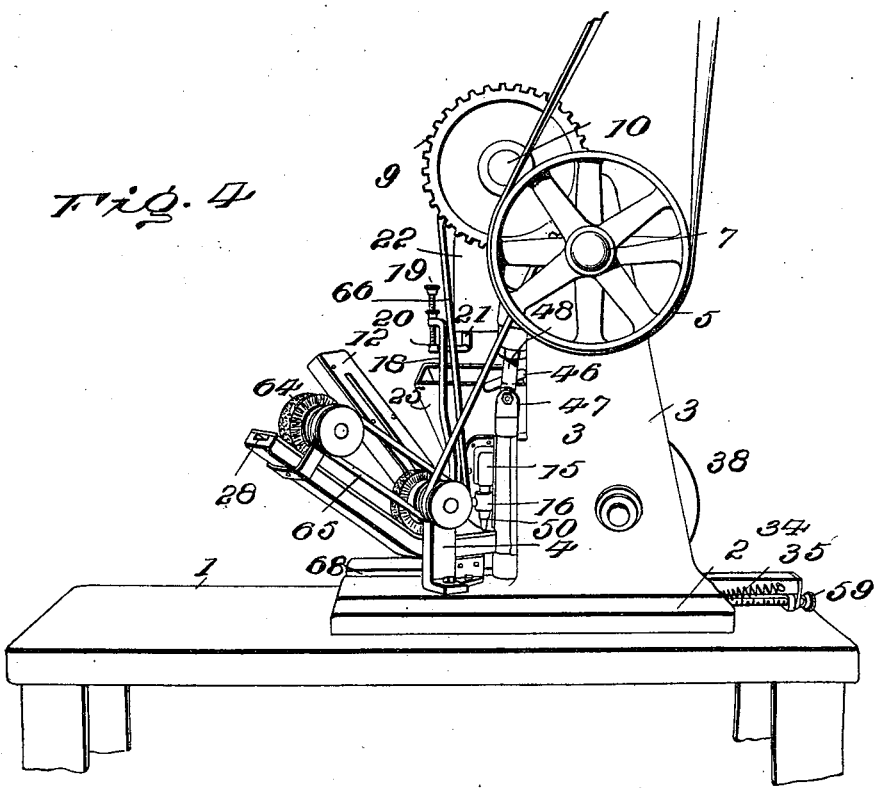

No. 666,917. Patented Jan. 29, 1901.
C. G. BAUER.
MACHINE FOR CHARGING WAX AND CORKS INTO VESSEL CAPS.
(Application filed Apr. 14, 1900.)

(No Model.) 5 Sheets—Sheet 4.

Witnesses

Inventor
Charles G. Bauer
by
Benj. R. Catlin
Attorney

No. 666,917. Patented Jan. 29, 1901.
C. G. BAUER.
MACHINE FOR CHARGING WAX AND CORKS INTO VESSEL CAPS.
(Application filed Apr. 14, 1900.)
(No Model.) 5 Sheets—Sheet 5.
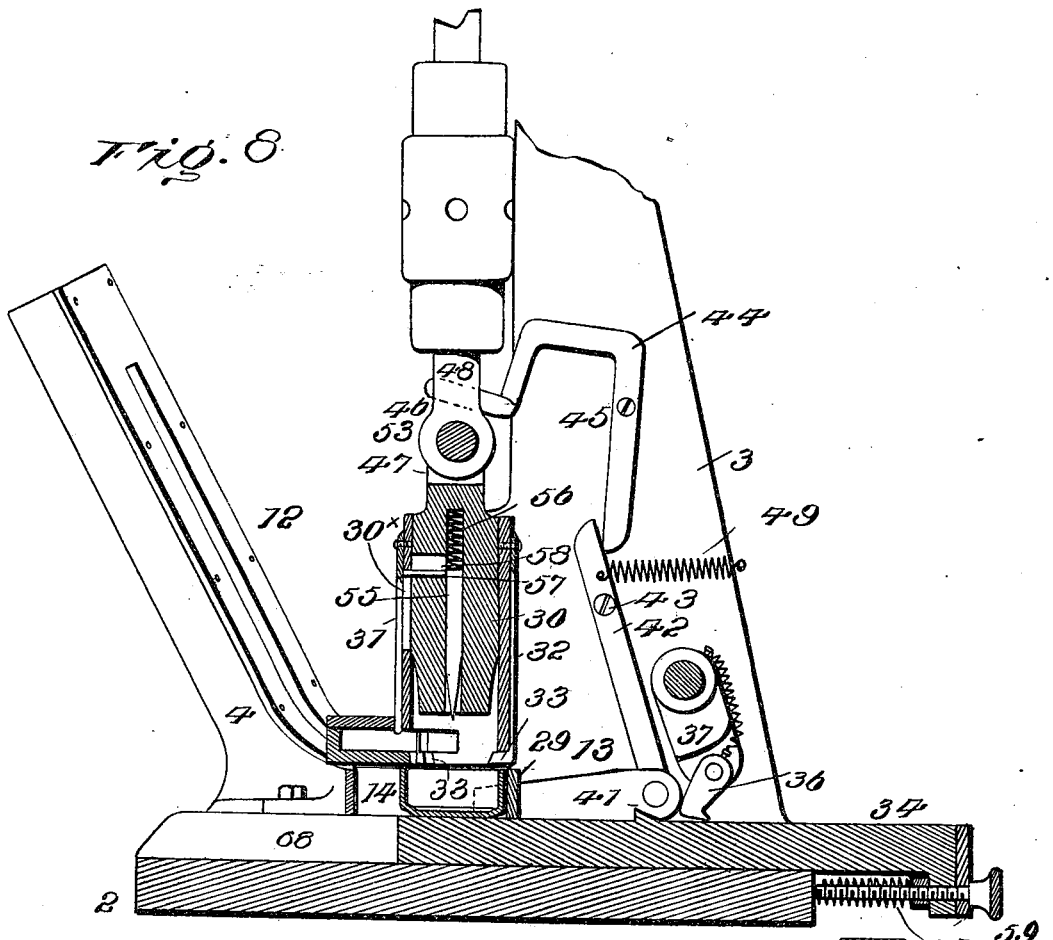
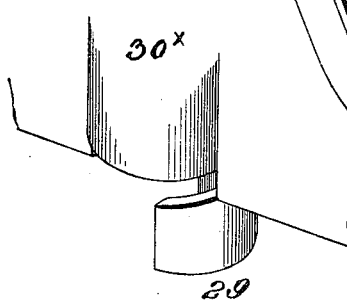
Witnesses
Inventor
Charles G. Bauer
by Benj. R. Catlin
Attorney

250
UNITED STATES PATENT OFFICE.

CHARLES G. BAUER, OF NEW YORK, N. Y., ASSIGNOR TO THE AMERICAN STOPPER COMPANY, OF SAME PLACE.

MACHINE FOR CHARGING WAX AND CORKS INTO VESSEL-CAPS.

SPECIFICATION forming part of Letters Patent No. 666,917, dated January 29, 1901.

Application filed April 14, 1900. Serial No. 12,823. (No model.)

*To all whom it may concern:*

Be it known that I, CHARLES G. BAUER, a resident of New York, (Brooklyn,) in the county of Kings and State of New York, have invented certain new and useful Improvements in Machines for Charging Wax and Corks into Vessel-Caps; and I do hereby declare the following to be a full, clear, and exact description of the invention, such as will enable others skilled in the art to which it pertains to make and use the same.

The invention relates to machines for charging bottle-caps and the like with wax and corks; and it has for its objects to increase the efficiency, accuracy, and economy of operation of such machines.

The invention consists in the construction herein described and pointed out.

Figure 6:
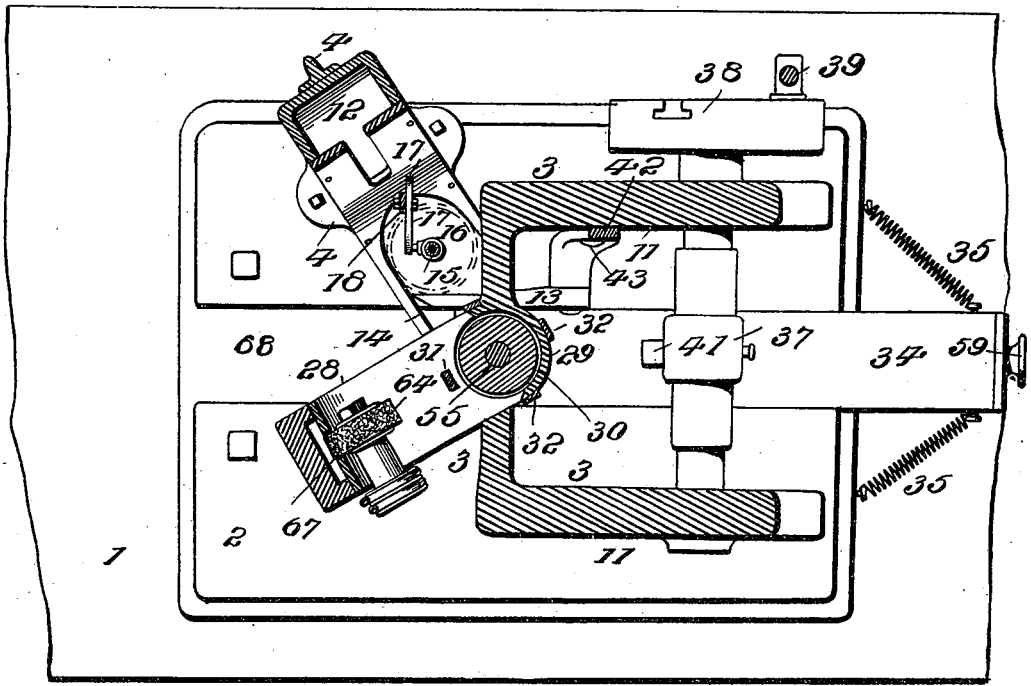
Figure 7:
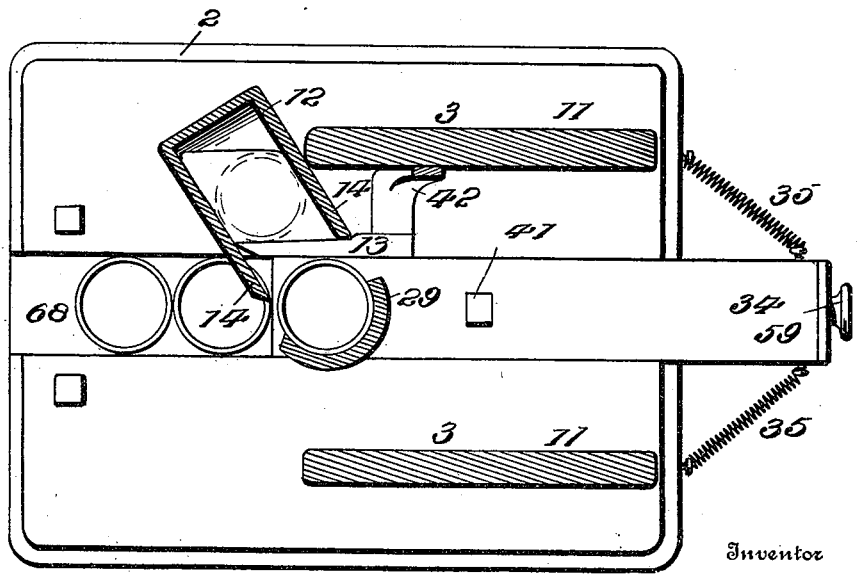

In the accompanying drawings, Figure 1 is a perspective of the improved machine. Fig. 2 is a front elevation. Fig. 3 is a partial rear elevation. Fig. 4 is a lateral perspective. Fig. 5 is a partial rear perspective. Fig. 6 is an enlarged section on line 6 6 of Fig 2. Fig. 7 is an enlarged section on line 7 7 of Fig. 2. Fig. 8 is a partial enlarged section on line 8 8 of Fig. 4. Figs. 9 and 10 are perspectives of details. Fig. 11 is a partial section of a detail. Fig. 12 is a cross-section of a shaft provided with a cock-opening cam.

Numeral 1 denotes a bench, table, or other suitable support, and 2 a machine-base.

3 denotes a frame comprising standards supporting various mechanisms, and 4 denotes posts or supports for a cap-hopper, a wax-reservoir, and a cork-hopper.

5 denotes a driving-pulley, and 6 a loose pulley on a stud-shaft 7, fixed to a standard.

8 is a pinion fixed to pulley 5 and driving a gear-wheel 9, fixed on a shaft 10, having bearings 11 in standards. The shaft 10 actuates a wax-charging cock, a cap-segregating device, a cork-charging plunger, and brushes to suitably feed the corks under the plunger by the medium of devices which will be described as near as practicable in the order of their operation.

12 denotes a cap magazine or hopper, which may be supplied with caps by hand or by any convenient means. Its chute has such situation that caps will move down in it by gravity to a situation in a fixed seat immediately under the plunger.

13 denotes a movable stop or separator to be interposed to separate each cap that arrives at the bottom of the chute from those above and to hold back the upper caps until another cap is to be charged.

The bottom cap and separator are shown in Fig. 8, and said separator and overlying cap are shown in Fig. 6, the cap being denoted by dotted lines in said figure.

14 denotes arms or cap-guide extensions of the chute, (see Fig. 10,) which extend under the cork-charging position. (Illustrated in Fig. 8.)

The cap is charged with a small quantity of wax while it is held next above the cap stop and separator 13. A wax-charging pipe is denoted by 15, its nozzle by 50, and a charging-cock by 16. To an extension of the cock-plug is fixed a slotted arm 17, (see Figs. 1 and 2,) to which is pivotally connected a rod or bar 18, adjustably supported by means of a screw 19 on an arm 20 of a bar 21, sliding in a box 22 and suitably lifted by a cam 23, fixed on shaft 10. A returning-spring is denoted by 24. Every rotation of the cam lifts the bar 21 and turns the cock to discharge a small quantity of molten wax into the cap, situated as indicated in Fig. 6. The cock is closed by the spring.

The wax is kept suitably hot and fluid in a reservoir 25, having an inclined bottom provided with a steam-chamber 26. Steam-circulating pipes are denoted by 27.

Corks are fed through an inclined chute or hopper 28 and moved by means of brushes to a situation immediately over a cap in the seat 29 and immediately under the cork-charging plunger 30.

31 denotes a guide bearing on the top of the cork as it passes out of chute 28 onto supporting spring-fingers 32. These have bent cork-supporting ends 33, beveled to facilitate the downward passage of the cork under the action of the plunger. Said fingers are pushed outwardly by the cork when it is pushed down into a waxed cap by the descent of the plunger. The cap thus charged with wax and cork is discharged from the machine by a slide-bar 34, forced forward by the springs 35.

It is retracted for a repetition of the operation by a pawl 36, carried by an arm 37 on a stud adjustably fixed to a rocking member or disk 38, rocked by means of a connecting-rod 39, actuated by a rotating disk 40 on shaft 10.

As shown in Fig. 8, the springs have just performed their duty and moved a cap under the plunger. The arm 37 is about to be rocked forward and carry the pawl into engagement with a tooth 41 on the slide-bar 34.

The cap-separator is operated by a lever 42, adapted to swing about a fulcrum 43. It is moved to withdraw the separator by means of a lever 44, having a fulcrum at 45, and bearing at 46 upon a vertically-movable yoke 47, connected to a rod 48. The ascent of the yoke and rod causes the lower end of lever 44 to move inwardly, and thereby move the upper end of lever 42 similarly, with the effect to move its lower end outwardly and withdraw the cap-separator, which permits the caps to descend in the hopper, carrying the lower one into the curved stop or seat 29, fixed to a standard, the preceding cap having been moved out of said seat, as above described. The cap separating and alining arm 13 is returned by a spring 49 and is interposed above the lower cap, situated in seat 29 and in contact therewith, and has the effect to properly adjust the cap in said seat, which is situated below the foot of the cork-feeding chute. The cap drops upon the slide 34 and is held in the side seat or stop 29 by the separator 13 in alinement with the plunger 30 and the interposed cork supported on the spring-finger ends 33.

The cork is forced into the waxed bottom of the cap by the plunger, which is actuated by the crank 51 of shaft 10 by means of the lengthwise-adjustable connecting-rod 48, having at its foot a cross-head 53, pivoted in a yoke 47 at the upper end of said plunger.

55 denotes a centering-pin movable in the plunger and pressed down therein by a spring 56. The movement of the pin relative to the plunger is limited by an arm 57, playing in a slot 58. When the plunger descends, the pin is pushed into the cork and holds it against lateral displacement. By the further descent of the plunger the cork is pushed off the pin and seated in a cap, as above specified, the operation spreading the previously-supplied wax and cementing the cork to the bottom of the cap.

Referring to details, the screw 59 (best shown in Fig. 8) provides for stopping the advance of the cap-discharging slide. The rod 39 has its upper end in a sleeve 60, loose on a stud 62, adjustably fixed in a slot 63 of the rotating wheel 40. The opposite end of said rod is similarly secured to the disk 38, which is rocked thereby. The brushes 64 are driven by a pulley on shaft 10 by means of belts 65 and 66. The periphery of each of said brushes plays in a slot 67 in the cork-chute cover and acts upon the corks therein.

The operation of the machine is continuous. The cork and cap chutes are situated adjacent to each other and corks and caps can be fed to the same in any desired manner, and if fed by hand the work may be done by one person, though if the machine be worked rapidly and one person is found insufficient two may be employed. The chutes being supplied, respectively, with corks and caps and the wax-reservoir supplied with melted wax and shaft 10 connected with the power-shaft, the cap next above the separator 13 is waxed, and the plunger forces a cork into the previously-waxed cap, a cork having in the meantime been interposed immediately between the plunger and cap, so as to be pushed into the cap, which is then immediately moved from under the plunger and toward the machine-discharge (see Fig. 7) by means of the slide, the separator 13 being meantime withdrawn and advanced to feed a fresh cap under the plunger and permit its successor to descend under the wax-charging nozzle. The slide moves in a way 68, formed in the base, and said way guides the caps out of the machine. The cap rests on this slide during the action of the plunger and until said slide is retracted, whereupon it drops into the way in the path of the slide to be ejected thereby.

Having thus described my invention, what I claim as new, and desire to secure by Letters Patent, is—

1. In a machine for charging vessel-caps with corks, a plunger, a chute to charge caps by gravity immediately under said plunger, devices for charging corks under said plunger, and means for discharging the caps supplied with corks.

2. In a machine for charging vessel-caps with wax and corks, a plunger, devices for charging caps under said plunger, devices for charging corks under said plunger, apparatus for charging wax into the caps, and means for discharging the caps supplied with corks.

3. In a machine for charging vessel-caps with corks, a plunger, a chute for charging caps by gravity immediately under the plunger, and the cap-separating finger to intermittently arrest the descent of the caps in the chute.

4. In a machine for charging vessel-caps with corks, a plunger, a chute for charging caps by gravity immediately under the plunger, the cap-separating finger to intermittently arrest the descent of the caps in the chute, and a stop to hold a cap in operative situation under the plunger.

5. In a machine for charging vessel-caps with corks, a plunger, a chute for charging caps by gravity immediately under the plunger, the cap-separating finger to intermittently arrest the descent of the caps in the chute, and a stop to hold a cap in operative situation under the plunger, said finger being adapted to hold a cap in the stop while separating it from adjacent caps in the chute.

6. In a machine for charging vessel-caps with corks, a plunger, a chute for charging caps by gravity immediately under the plunger, the cap-separating finger to intermittently arrest the descent of the caps in the chute, a seat to hold a cap in operative situation under the plunger, and a slide to move the caps away from the stop.

7. In a machine for charging vessel-caps with corks, a cork-feeding chute having a slotted side and adapted to hold a series of corks in a line lengthwise the chute, in combination with brushes situated in the slot to move the alined corks in the chute.

8. In a machine for charging vessel-caps with corks, a plunger, devices for charging corks under the plunger, and a friction-pin to bear on the surface of the cork situated adjacent the plunger.

9. In a machine for charging vessel-caps with corks, a plunger, devices for charging corks under the plunger, and a centering-pin movable in the plunger to hold the cork properly alined.

10. In a machine for charging vessel-caps with corks, a plunger, a chute for charging a cap immediately under the plunger, and devices for supporting a cork above the cap and in alinement therewith.

11. In a machine for charging vessel-caps with corks, a plunger, a chute for charging a cap immediately under the plunger, and devices for supporting a cork above the cap and in alinement therewith, said devices consisting of spring-fingers bent under the cork situated immediately beneath the plunger.

12. In a machine for charging vessel-caps with corks, a plunger, a cap-charging chute extending immediately under the plunger, a seat to stop the cap under the plunger, and a cap-separating finger to separate the seated cap from adjacent caps.

13. In a machine for charging vessel-caps with corks, a plunger, a cap-charging chute extending immediately under the plunger, a seat to stop the cap under the plunger, and a cap-separating finger to separate the seated cap from adjacent caps, said finger being mediately reciprocated by the plunger.

14. In a machine for charging vessel-caps with corks, a cap-charging chute, a cork-charging chute, and a plunger, said chutes being adapted to charge caps and corks directly under the plunger.

15. In a machine for charging vessel-caps with corks, a cap-charging chute, a cork-charging chute, a plunger, and cork-supporting spring-fingers, said cork-chute being adapted to charge corks upon the fingers directly under the plunger, and the cap-chute adapted to charge caps by gravity directly under the spring-fingers and corks thereon.

16. In a machine for charging vessel-caps with wax and corks, a spring-actuated cap-discharging slide, and a rocking arm carrying a pawl to retract the slide and compress its springs.

17. In a machine for charging vessel-caps with wax and corks, a grooved base, a slide movable in the groove of the base, mechanism for fixing corks in caps supported on the slide, and mechanism for withdrawing the slide from under a cap and for returning said slide to push the cap along the groove.

18. In a machine for charging vessel-caps with wax and corks, a cap-charging chute, a nozzle, and means for automatically charging wax into a cap situated in the chute.

19. In a machine for charging vessel-caps with wax and corks, a shaft 10 having a cam 23, a reciprocating device moved by the cam, a spring to retract the said reciprocating device, and a wax-charging cock operatively connected to said device.

20. In a machine for charging vessel-caps with wax and corks, cap-charging devices, cork-charging devices, apparatus for dropping wax into caps, a plunger to insert corks into caps, a cap-discharger, and a shaft actuating all the mechanism.

21. In a machine for charging vessel-caps with wax and corks, cap-charging devices, a cap-separator, cork-charging devices, apparatus for dropping wax into caps, a plunger to insert corks into caps, a cap-discharger, and a shaft actuating all the mechanism.

In testimony whereof I have signed this specification in the presence of two subscribing witnesses.

CHARLES G. BAUER.

Witnesses:
HUGO HIRSH,
HENRY S. RASQUIN.